US012620665B2

(12) United States Patent
Park et al.

(10) Patent No.: US 12,620,665 B2
(45) Date of Patent: May 5, 2026

(54) BATTERY PACK AND DEVICE INCLUDING THE SAME

(71) Applicant: LG Energy Solution, Ltd., Seoul (KR)

(72) Inventors: Won Kyoung Park, Daejeon (KR);
Junyeob Seong, Daejeon (KR);
Honggoo Han, Daejeon (KR); **Hyun
Seop Yun**, Daejeon (KR)

(73) Assignee: LG Energy Solution, Ltd., Seoul (KR)

( * ) Notice: Subject to any disclaimer, the term of this
patent is extended or adjusted under 35
U.S.C. 154(b) by 998 days.

(21) Appl. No.: 17/776,426

(22) PCT Filed: Mar. 9, 2021

(86) PCT No.: PCT/KR2021/002907
§ 371 (c)(1),
(2) Date: May 12, 2022

(87) PCT Pub. No.: WO2021/221295

PCT Pub. Date: Nov. 4, 2021

(65) Prior Publication Data

US 2022/0407163 A1      Dec. 22, 2022

(30) Foreign Application Priority Data

Apr. 29, 2020    (KR) ........................ 10-2020-0052254

(51) Int. Cl.
H01M 50/242      (2021.01)
H01M 10/613      (2014.01)
(Continued)

(52) U.S. Cl.
CPC ....... H01M 50/264 (2021.01); H01M 10/613
(2015.04); H01M 10/6554 (2015.04);
(Continued)

(58) Field of Classification Search
None
See application file for complete search history.

(56) References Cited

U.S. PATENT DOCUMENTS 5,484,667 A * 1/1996 Sahli ................... H01M 50/291
180/68.5
2012/0087091 A1* 4/2012 Nassoiy ........... H01M 10/6568
361/701

(Continued)

FOREIGN PATENT DOCUMENTS

CN          105098112 A      11/2015
CN          108028336 A       5/2018
(Continued)

OTHER PUBLICATIONS

Extended European Search Report including Written Opinion for
Application No. 21797338.7 dated Jan. 24, 2024, pp. 1-8.
(Continued)

*Primary Examiner* — Amanda J Barrow
(74) *Attorney, Agent, or Firm* — Lerner David LLP

(57)          ABSTRACT

An embodiment of the present invention provides a battery
pack including: a plurality of battery modules each config-
ured to include a battery cell stack on which a plurality of
battery cells are stacked and a module frame for accommo-
dating the battery cell stack; a pack frame configured to
accommodate the battery modules; and fixing brackets
respectively positioned on front and rear surfaces of the
battery module, wherein protrusions are respectively formed
on the front and rear surfaces of the battery module, and the
fixing brackets surround the protrusions and are coupled to
the pack frame.

16 Claims, 12 Drawing Sheets

(51) Int. Cl.
  H01M 10/6554 (2014.01)
  H01M 10/6556 (2014.01)
  H01M 50/211 (2021.01)
  H01M 50/264 (2021.01)
  H01M 50/691 (2021.01)
(52) U.S. Cl.
  CPC ..... H01M 10/6556 (2015.04); H01M 50/211 (2021.01); H01M 50/242 (2021.01); H01M 50/691 (2021.01)

(56) References Cited

U.S. PATENT DOCUMENTS

| | | | | |
|---|---|---|---|---|
| 2012/0312614 | A1* | 12/2012 | Fujiwara | H01M 50/209 |
| | | | | 180/68.5 |
| 2013/0224539 | A1* | 8/2013 | Hayashi | H01M 50/60 |
| | | | | 429/82 |
| 2014/0234690 | A1 | 8/2014 | Lee et al. | |
| 2014/0356662 | A1* | 12/2014 | Yang | B60L 58/21 |
| | | | | 429/72 |
| 2015/0207187 | A1* | 7/2015 | Beltz | B23P 15/26 |
| | | | | 29/890.035 |
| 2015/0249238 | A1* | 9/2015 | Andre | H01M 10/625 |
| | | | | 429/99 |
| 2016/0093930 | A1* | 3/2016 | Biskup | H01M 10/653 |
| | | | | 429/120 |
| 2016/0133897 | A1* | 5/2016 | Schreiber | H01M 50/209 |
| | | | | 429/120 |
| 2017/0047563 | A1 | 2/2017 | Lee et al. | |
| 2017/0047623 | A1 | 2/2017 | Kim et al. | |
| 2018/0123195 | A1 | 5/2018 | Fees et al. | |
| 2018/0151930 | A1* | 5/2018 | Kim | H01M 10/6554 |
| 2018/0219191 | A1* | 8/2018 | Drews | H01M 10/647 |
| 2018/0219197 | A1 | 8/2018 | Yu et al. | |
| 2018/0269441 | A1* | 9/2018 | Yum | H01M 50/262 |
| 2019/0074562 | A1 | 3/2019 | Kim et al. | |
| 2019/0103594 | A1* | 4/2019 | Furusawa | H01M 50/298 |
| 2019/0148689 | A1* | 5/2019 | Keum | H01M 50/204 |
| | | | | 429/151 |
| 2019/0173064 | A1* | 6/2019 | Lee | H01M 10/625 |
| 2019/0348652 | A1* | 11/2019 | Zhao | H01M 50/289 |
| 2020/0185672 | A1 | 6/2020 | Seo et al. | |
| 2022/0029220 | A1* | 1/2022 | Hwang | H01M 10/613 |
| 2022/0367940 | A1* | 11/2022 | Yun | H01M 10/617 |
| 2023/0163376 | A1* | 5/2023 | Park | H01M 10/6556 |
| | | | | 429/120 |
| 2023/0198073 | A1* | 6/2023 | Lee | H01M 50/244 |
| | | | | 429/149 |

FOREIGN PATENT DOCUMENTS

| | | | | | |
|---|---|---|---|---|---|
| CN | 109367378 | A | 2/2019 | | |
| CN | 208460816 | U | 2/2019 | | |
| CN | 208873788 | U | 5/2019 | | |
| EP | 3116048 | A1 | 1/2017 | | |
| EP | 3327821 | A1 | 5/2018 | | |
| JP | 2009146795 | A | 7/2009 | | |
| JP | 2013229182 | A | 11/2013 | | |
| JP | 2017515266 | A | 6/2017 | | |
| JP | 2018-527705 | A | 9/2018 | | |
| KR | 20130078933 | A | 7/2013 | | |
| KR | 20140147979 | A | 12/2014 | | |
| KR | 20170019770 | A | 2/2017 | | |
| KR | 20170047084 | A | 5/2017 | | |
| KR | 20170084699 | A | 7/2017 | | |
| KR | 20170085681 | A | 7/2017 | | |
| KR | 102065099 | B1 | 1/2020 | | |
| KR | 20200021608 | A | 3/2020 | | |
| WO | WO 2017/123003 | | * | 7/2017 | H01M 10/625 |

OTHER PUBLICATIONS

Search Report dated Jun. 27, 2024 from the Office Action for Chinese Application No. 202180006349.4 issued Jun. 29, 2024, 2 pages. [see p. 1, categorizing the cited references].
International Search Report for Application No. PCT/KR2021/002907 mailed Jul. 6, 2021, pp. 1-3.

* cited by examiner

【Figure 1】
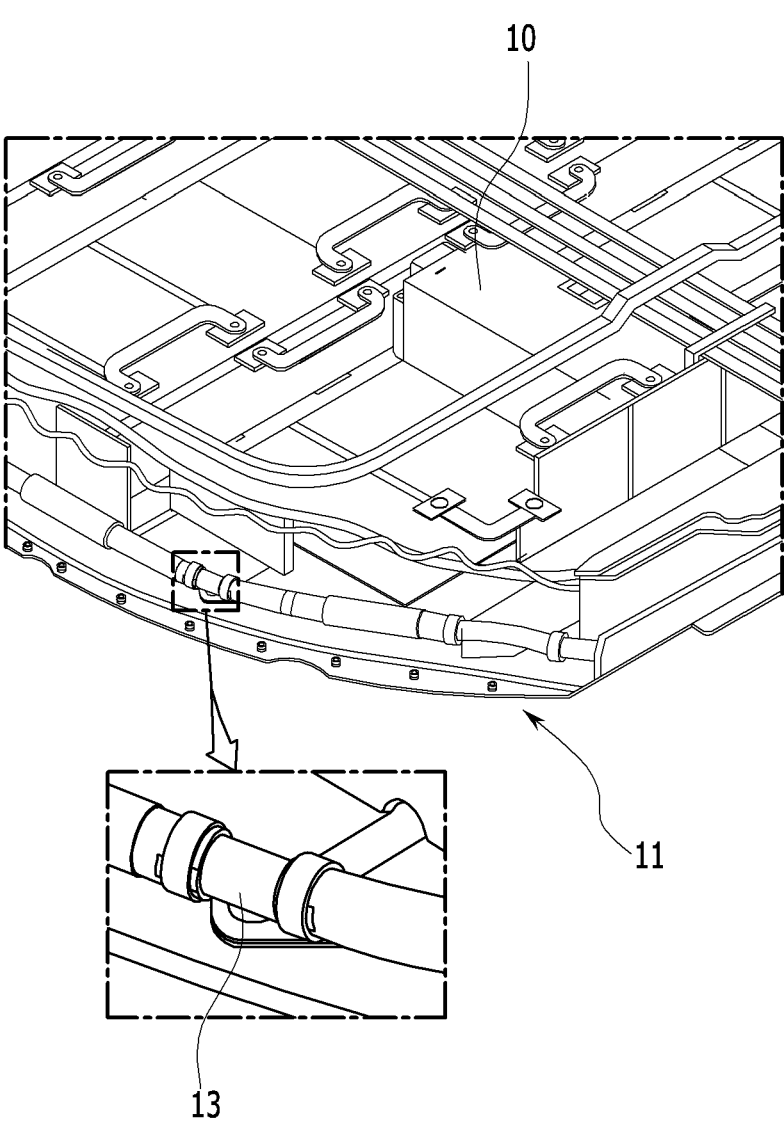

【Figure 2】
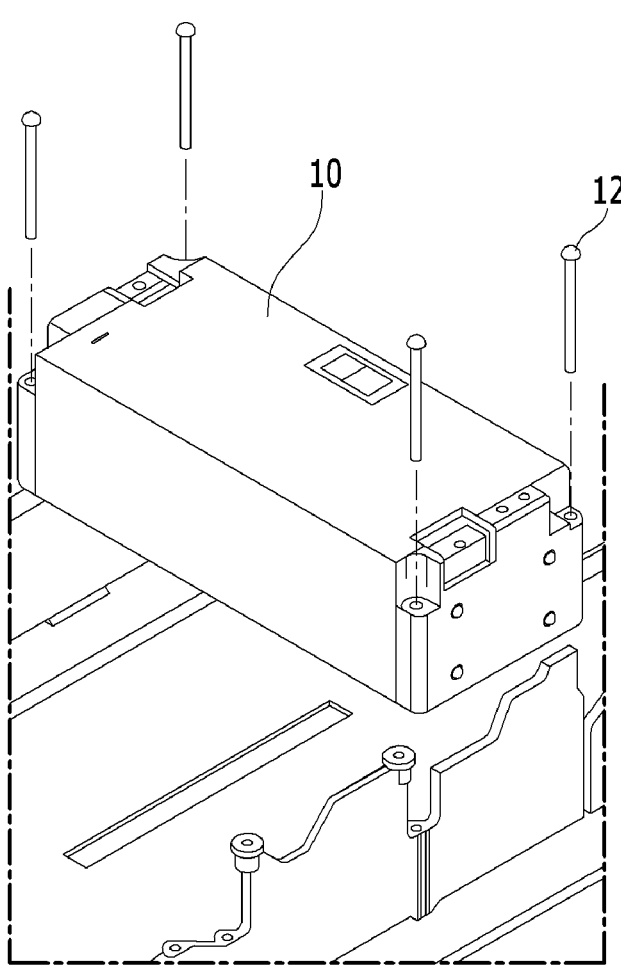

【Figure 3】
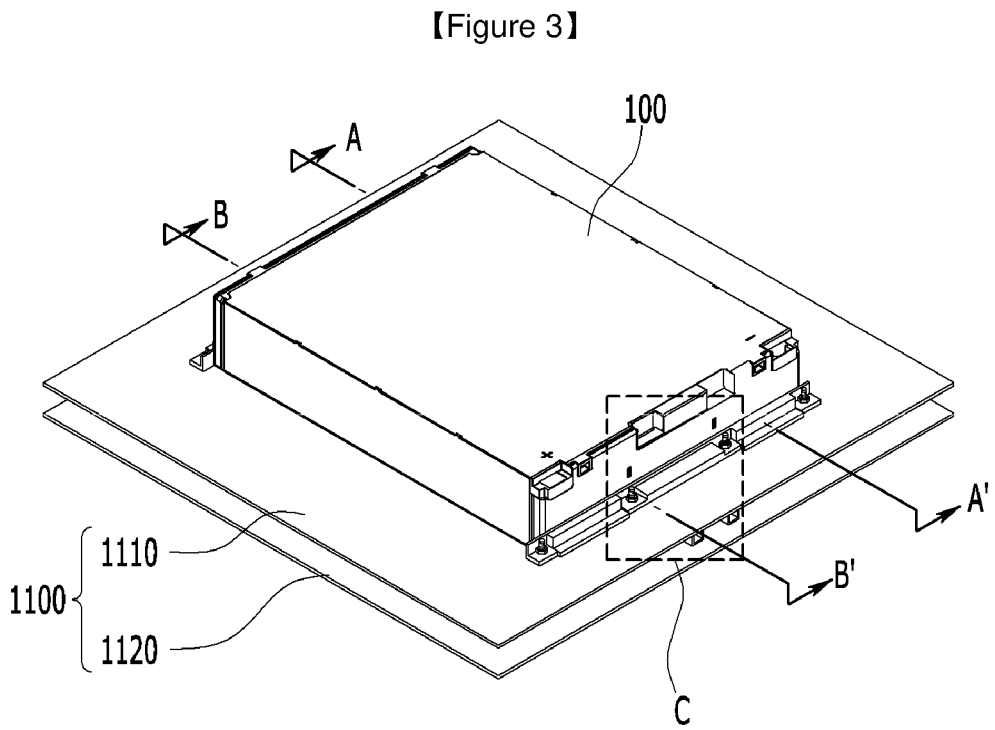

【Figure 4】
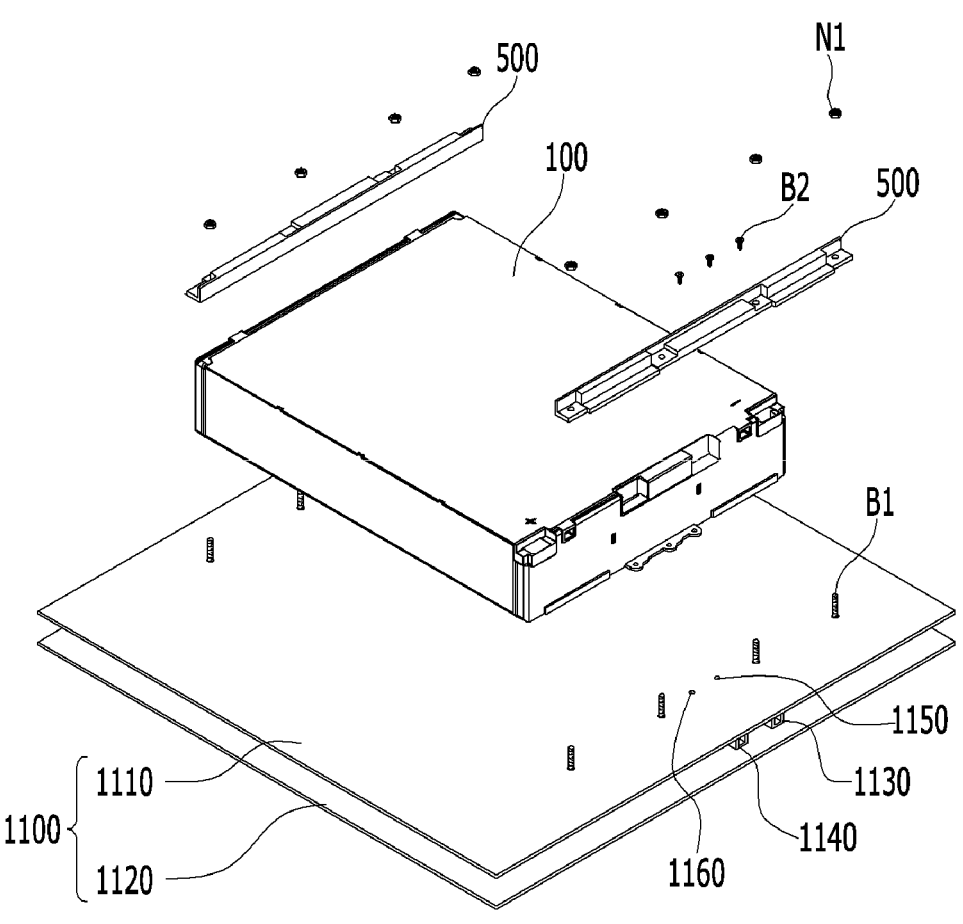

【Figure 5】
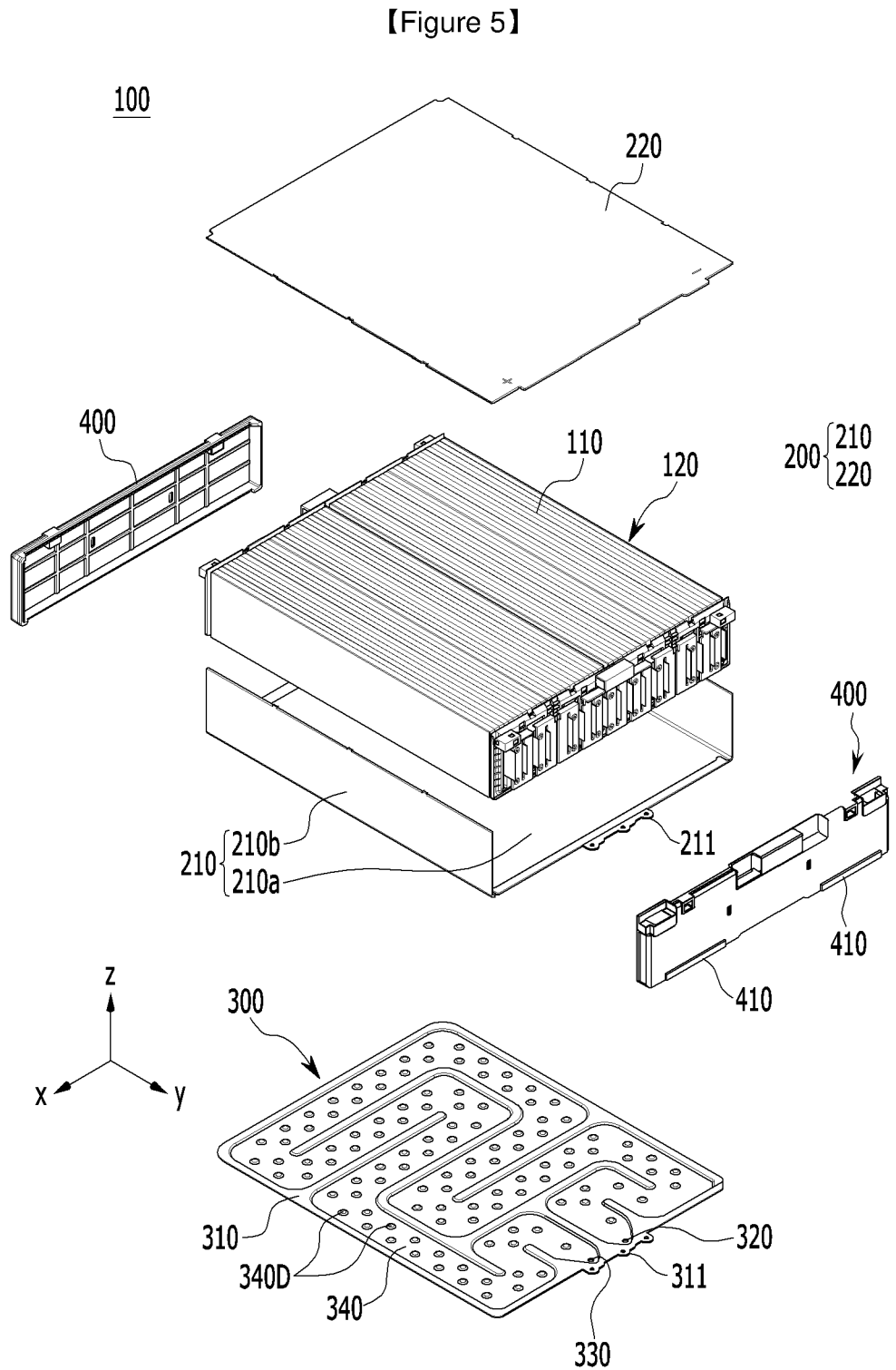

【Figure 6】
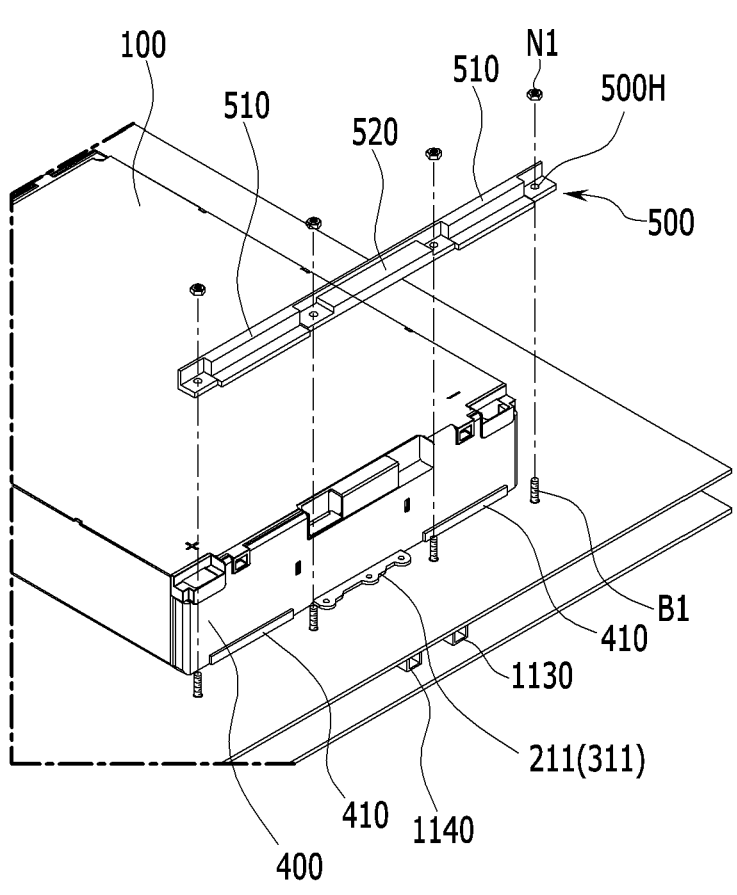

【Figure 7】
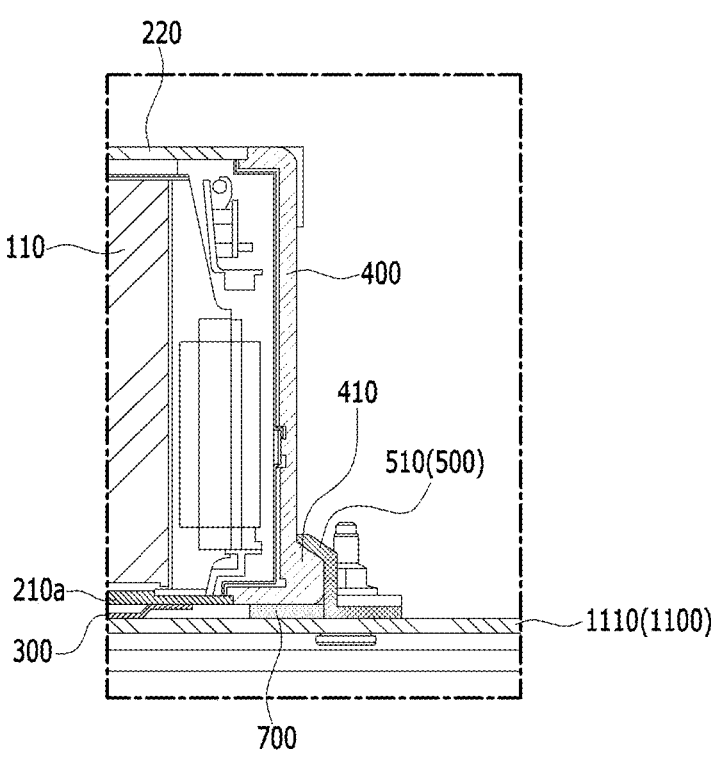
【Figure 7A】
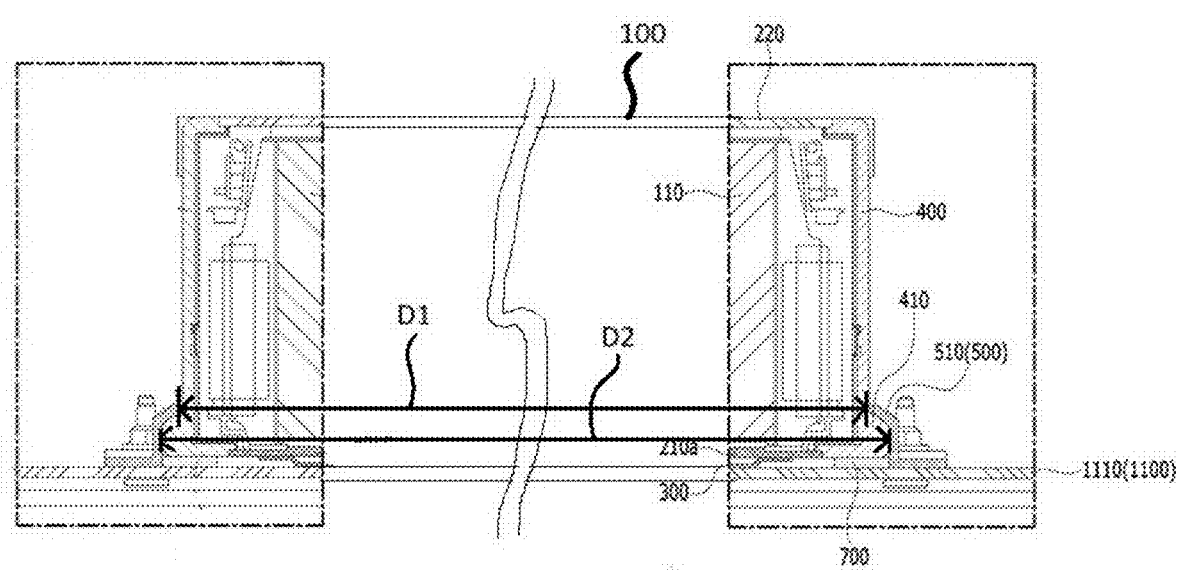

【Figure 8】
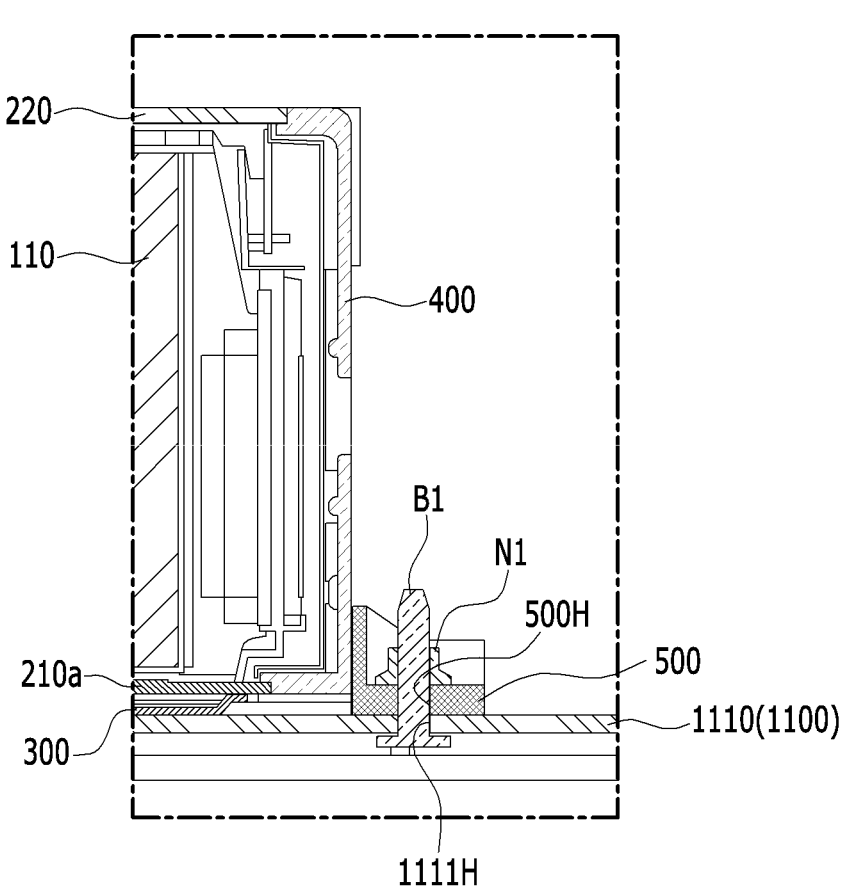

【Figure 9】
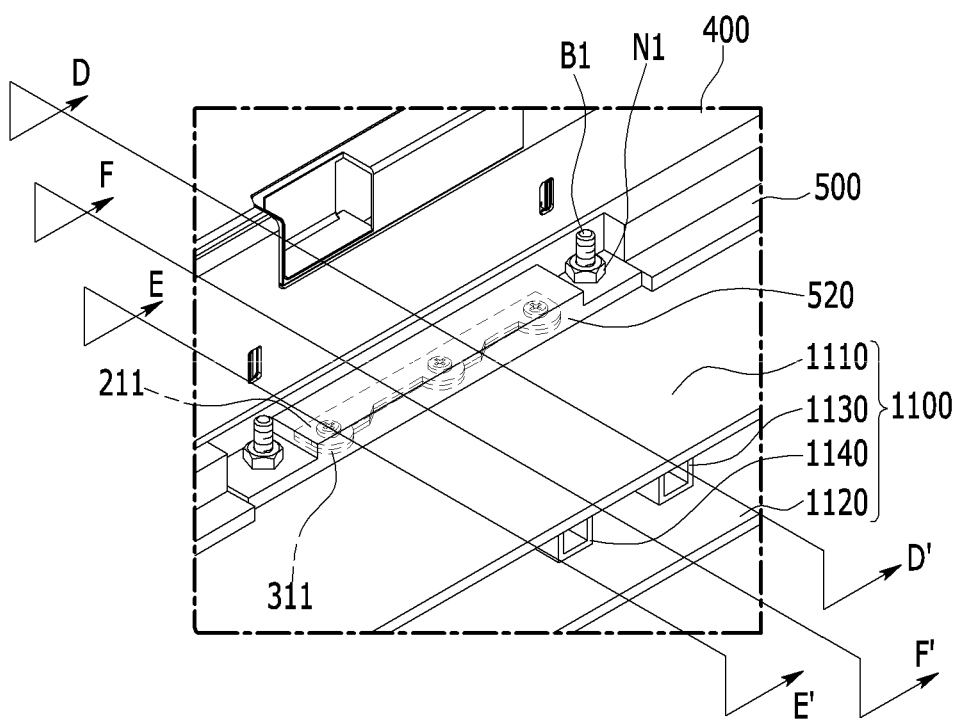

【Figure 10】
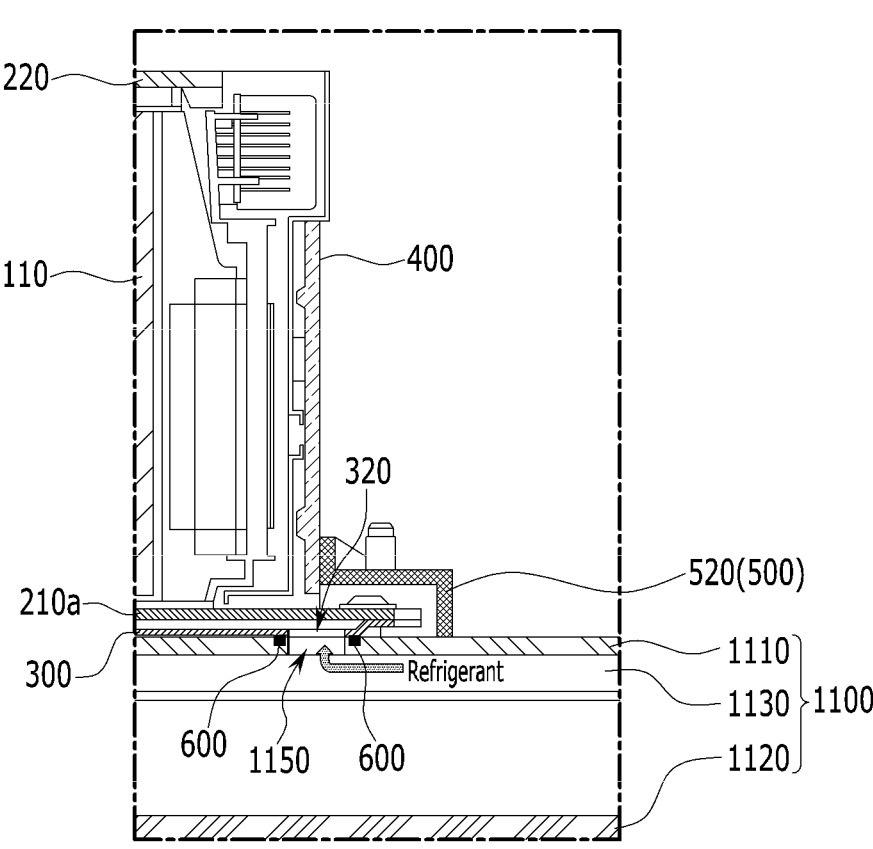

【Figure 11】
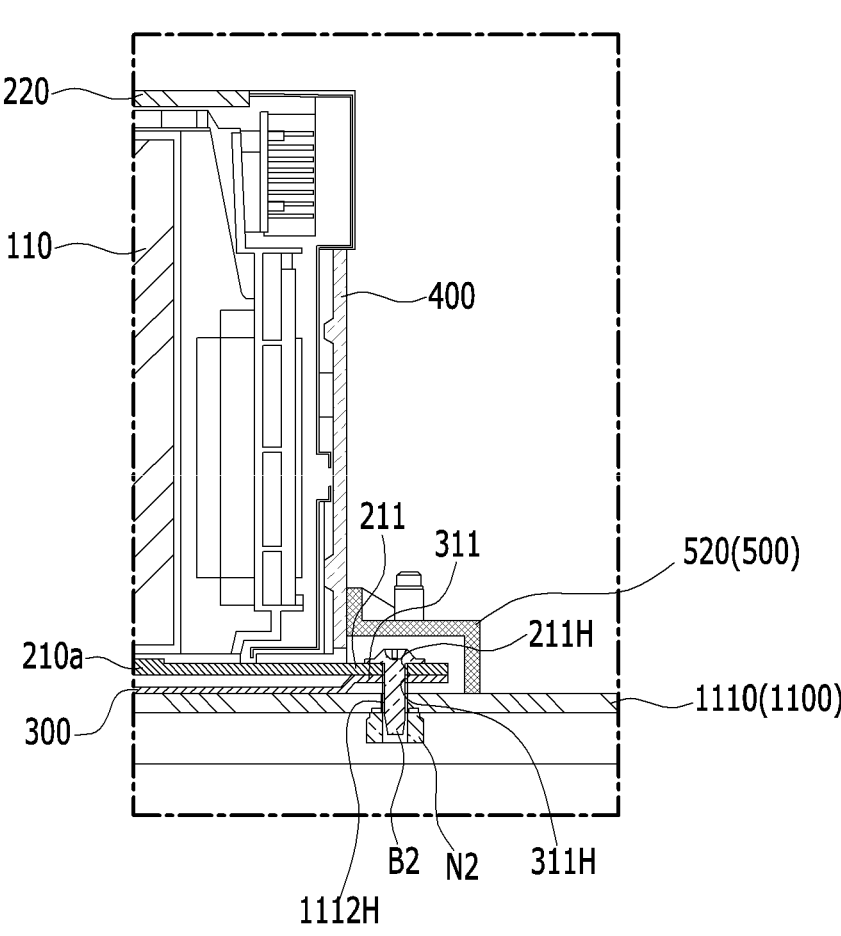

【Figure 12】
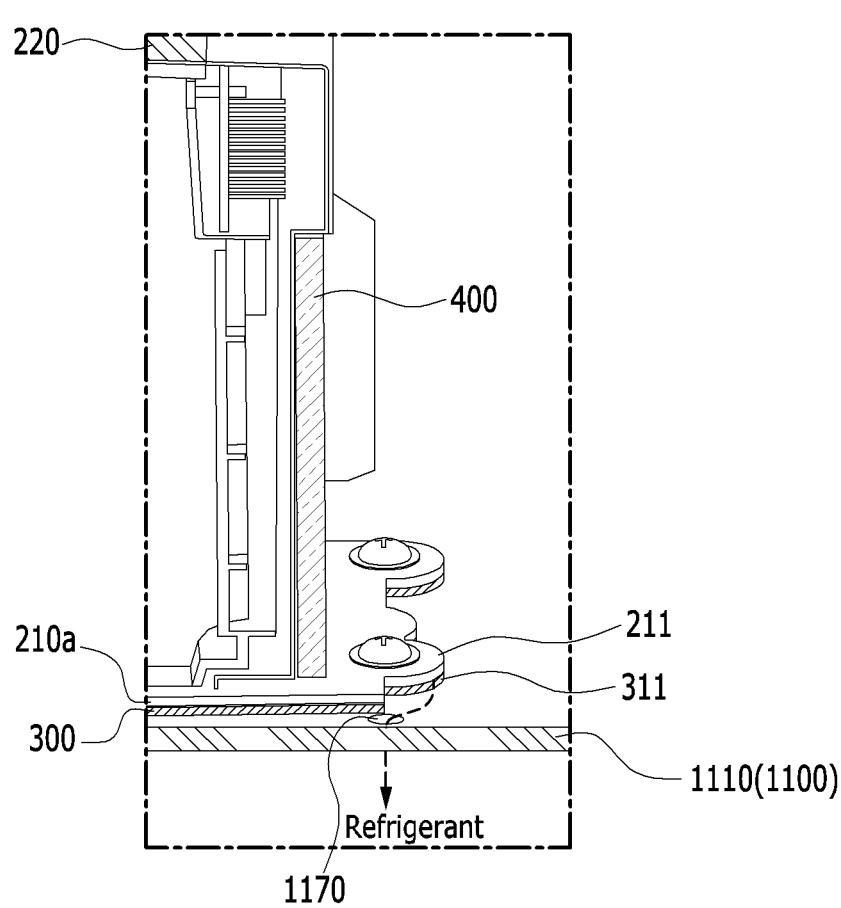

BATTERY PACK AND DEVICE INCLUDING THE SAME

CROSS-REFERENCE TO RELATED APPLICATIONS

This application is a national phase entry under 35 U.S.C. § 371 of International Application No. PCT/KR2021/002907, filed on Mar. 9, 2021, published in Korean, which claims priority to Korean Patent Application No. 10-2020-0052254, filed on Apr. 29, 2020, the entire contents of which are hereby incorporated herein by reference.

TECHNICAL FIELD

Background Art

In modern society, as portable devices such as mobile phones, laptops, camcorders, and digital cameras are used in daily life, development of techniques related to mobile devices as described above is becoming active. In addition, a rechargeable battery capable of charging and discharging is a measure to solve air pollution such as from conventional gasoline vehicles using fossil fuels, is used as a power source for electric vehicles (EVs), hybrid electric vehicles (HEVs), and plug-in hybrid electric vehicles (P-HEV), and thus a need for development of rechargeable batteries is increasing.

Currently commercially available rechargeable batteries include a nickel cadmium battery, a nickel hydrogen battery, a nickel zinc battery, and a lithium rechargeable battery, and among them, the lithium rechargeable battery has little memory effect compared to nickel-based rechargeable batteries, so it is in the spotlight as it is freely charged and discharged, has a very low self-discharge rate, and has high energy density.

Such a lithium rechargeable battery mainly uses a lithium-based oxide and a carbon material as a positive electrode active material and a negative electrode active material, respectively. The lithium rechargeable battery includes an electrode assembly in which a positive electrode plate and a negative electrode plate to which a positive electrode active material and a negative electrode active material are respectively applied with a separator therebetween, and a battery case for sealing and housing the electrode assembly together with an electrolyte.

In general, a lithium rechargeable battery may be classified into a can-type rechargeable battery in which an electrode assembly is embedded in a metal can, and a pouch-type rechargeable battery in which an electrode assembly is embedded in a pouch of an aluminum laminate sheet depending on a shape of an exterior material.

In the case of rechargeable batteries used for small devices, 2-3 battery cells are positioned, but in the case of rechargeable batteries used for mid- to large-sized devices such as vehicles, a battery module in which a plurality of battery cells are electrically connected is used. In such a battery module, a plurality of battery cells are connected in series or parallel to each other to form a battery cell stack, thereby improving capacity and output. In addition, one or more battery modules may be mounted together with various control and protection systems, such as a battery management system (BMS) and a cooling system, to constitute a battery pack.

In the case of a rechargeable battery, when a temperature thereof is higher than an appropriate temperature, performance of the rechargeable battery may be deteriorated, and in severe cases, there is a risk of explosion or ignition. In particular, in a battery module or battery pack including a plurality of rechargeable batteries, that is, a battery cell, heat from a plurality of battery cells is added up in a narrow space, so that the temperature may rise more rapidly and severely. In other words, in the case of a battery module in which a plurality of battery cells are stacked and a battery pack in which such a battery module is mounted, high output may be obtained, but it is not easy to remove heat generated in the battery cells during charging and discharging. When heat dissipation of the battery cells is not properly performed, the deterioration of the battery cells is accelerated and a lifespan thereof is shortened, and a possibility of explosion or ignition increases.

Further, in the case of a battery module included in a vehicle battery pack, it may be frequently exposed to direct sunlight, and may be placed in a high temperature condition such as in summer or in a desert area.

Accordingly, when configuring the battery module or battery pack, it can be said that it is very important to secure stable and effective cooling performance.

FIG. 1 illustrates a partial perspective view of a conventional battery pack, and FIG. 2 illustrates a partial perspective view showing a mounting method of a battery module included in the battery pack of FIG. 1.

Referring to FIG. 1 and FIG. 2, a conventional battery pack may include a plurality of battery modules 10 and a pack frame 11 in which the battery modules 10 are accommodated. For convenience of description, only one battery module is illustrated in FIG. 1.

In the conventional battery pack, a refrigerant pipe is provided for cooling the battery modules 10, and a refrigerant is supplied through a refrigerant pipe connector 13 connected to the refrigerant pipe. Such a refrigerant is usually a coolant, and a fluid indirect cooling structure for reducing a temperature thereof by enabling such a coolant to flow inside the battery pack is applied.

Meanwhile, when the battery modules 10 are accommodated in the pack frame 11, mounting holes are respectively provided at four corners, and mounting bolts 12 pass through the respective mounting holes to be fastened to the pack frame 11. Such mounting coupling may be made for each of the battery modules 10.

In this case, a cooling element such as the coolant pipe connector 13 for cooling the battery module 10 and a mounting element such as the mounting bolt 12 for mounting the battery module 10 are separately provided, and each of the elements has many and complex parts.

In addition, a situation in which a refrigerant leaks from the refrigerant pipe, the refrigerant pipe connector 13, and/or the like may occur due to assembly defects or accidents during operation, and thus-leaking refrigerant may penetrate into the battery pack, which causes a fire or explosion.

Accordingly, there is a need to develop a battery pack capable of minimizing damage due to refrigerant leakage while improving cooling performance.

The above information disclosed in this Background section is only for enhancement of understanding of the background of the invention, and therefore, it may contain information that does not form the prior art that is already known in this country to a person of ordinary skill in the art.

DISCLOSURE

Technical Problem

An object of the present invention is to provide a battery pack and a device including the same, capable of preventing damage due to refrigerant leakage while improving cooling performance.

However, the problem to be solved by the exemplary embodiments of the present invention is not limited to the above-described problems, and can be variously extended within the scope of the technical spirit included in the present invention.

Technical Solution

An embodiment of the present invention provides a battery pack including: a plurality of battery modules each configured to include a battery cell stack on which a plurality of battery cells are stacked and a module frame for accommodating the battery cell stack; a pack frame configured to accommodate the battery modules; and fixing brackets respectively positioned on front and rear surfaces of the battery module, wherein protrusions are respectively formed on the front and rear surfaces of the battery module, and the fixing brackets surround the protrusions and are coupled to the pack frame.

The protrusions may be formed at a lower edge of the front surface of the battery module and a lower edge of the rear surface of the battery module, and the fixing brackets may each include a fixing unit surrounding an upper surface and a side surface of the protrusion.

A bracket hole may be formed in the fixing bracket, and a first pack frame hole may be formed in the pack frame. The battery pack may further include a first bolt extending through the first pack frame hole and the bracket hole, and a first nut coupled to the first bolt.

The battery pack may further include an insulating member positioned between the protrusions and the pack frame.

The battery module may include a heat sink positioned below a bottom portion of the module frame, and the bottom portion of the module frame may constitute an upper plate of the heat sink.

The pack frame may include a pack refrigerant supply pipe for supplying a refrigerant and a refrigerant supply opening connected to the pack refrigerant supply pipe, the heat sink may include an inlet through which the refrigerant is introduced, and the inlet and the refrigerant supply opening may be connected to each other.

The battery module may include a gasket positioned between the heat sink and the pack frame, to surround the inlet and the refrigerant supply opening.

The pack frame may include a pack refrigerant discharge pipe for discharging a refrigerant and a refrigerant discharge opening connected to the pack refrigerant discharge pipe, the heat sink may include an outlet through which the refrigerant is introduced, and the outlet and the refrigerant discharge opening are connected to each other.

The module frame may include a module frame extension formed by extending a portion of the bottom portion of the module frame, and the heat sink may include a heat sink extension extending from a side of the heat sink to a portion where the module frame extension is positioned.

A second pack frame hole may be formed in the pack frame, a first mounting hole may be formed in the module frame extension, and a second mounting hole may be formed in the heat sink extension. The module frame may include a second bolt extending through the first mounting hole, the second mounting hole, and the second pack frame hole, and a second nut coupled to the second bolt.

The fixing bracket may include a cover portion covering the module frame extension and the heat sink extension.

A drain hole may be formed in a portion of the pack frame covered by the cover portion to extend therethrough.

The heat sink may include an inlet for inflow of the refrigerant, and at least a portion of the inlet may be positioned in the heat sink extension.

The heat sink and the bottom portion of the module frame may constitute a refrigerant passage, and the bottom portion of the module frame may be in contact with the refrigerant.

The heat sink may include a lower plate joined to the bottom portion of the module frame and a depressed portion formed downwardly.

The pack frame may include a support frame for supporting the battery module and a lower frame positioned below the support frame, and the support frame may include a pack refrigerant supply pipe and a pack refrigerant discharge pipe positioned between the support frame and the lower frame.

Advantageous Effects

According to the embodiments of the present invention, it is possible to effectively block damage due to refrigerant leakage while firmly fixing the battery module through such an improved fixing bracket structure. In addition, it is possible to reduce the number of components and simplify the structure.

The effects of the present invention are not limited to the effects mentioned above, and other effects not mentioned can be clearly understood by those skilled in the art from the description of the claims.

DESCRIPTION OF THE DRAWINGS

FIG. 1 illustrates a partial perspective view of a conventional battery pack.

FIG. 2 illustrates a partial perspective view showing a mounting method of a battery module included in the battery pack of FIG. 1.

FIG. 3 illustrates a perspective view showing a battery module and a pack frame included in a battery pack according to an embodiment of the present invention.

FIG. 4 illustrates an exploded perspective view showing a fixing bracket for fixing the battery module of FIG. 3 to the pack frame.

FIG. 5 illustrates an exploded perspective view showing the battery module of FIG. 3.

FIG. 6 illustrates a partial enlarged perspective view showing the pack frame and the fixing bracket of FIG. 4.

FIG. 7 illustrates a partial cross-sectional view taken along a line A-A' of FIG. 3.

FIG. 7A illustrates a full cross-sectional view taken along a line A-A' of FIG. 3.

FIG. 8 illustrates a partial cross-sectional view taken along a line B-B' of FIG. 3.

FIG. 9 illustrates a partial perspective view showing an enlarged portion C of FIG. 3.

FIG. 10 illustrates a partial cross-sectional view taken along a line D-D' of FIG. 9.

FIG. 11 illustrates a partial cross-sectional view taken along a line E-E' of FIG. 9.

FIG. 12 illustrates a partial cross-sectional view taken along a line F-F' of FIG. 9.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

FIG. 3 illustrates a perspective view showing a battery module and a pack frame included in a battery pack according to an embodiment of the present invention. FIG. 4 illustrates an exploded perspective view showing a fixing bracket for fixing the battery module of FIG. 3 to the pack frame. FIG. 5 illustrates an exploded perspective view showing the battery module of FIG. 3.

Referring to FIG. 3 to FIG. 5, a battery pack according to an embodiment of the present invention includes a plurality of battery modules 100, a pack frame 1100 including a plurality of battery modules 100, and fixing brackets 500 positioned on front and rear surfaces of the battery module 100, respectively. The battery module 100 includes a battery cell stack 120 in which a plurality of battery cells 110 are stacked and a module frame 200 for accommodating the battery cell stack 120.

The battery cells 110 may be pouch-type battery cells. Such a pouch-type of battery cell may be formed by accommodating an electrode assembly in a pouch case of a laminate sheet including a resin layer and a metal layer, and then thermally fusing an outer periphery of the pouch case. In this case, the battery cells 110 may be formed to have a rectangular sheet-like structure.

The battery cells 110 may be configured in a plurality, and may be stacked to be electrically connected to each other to constitute the battery cell stack 120. In particular, as illustrated in FIG. 5, the battery cells 110 may be stacked in a direction that is parallel to an x-axis.

The module frame 200 accommodating the battery cell stack 120 may include an upper cover 220 and a U-shaped frame 210.

The U-shaped frame 210 may include a bottom portion 210a and two side portions 210b extending upward from opposite ends of the bottom portion 210a. The bottom portion 210a may cover a lower surface (opposite direction to a z-axis) of the battery cell stack 120, and the side portion 210b may cover opposite side surfaces (direction opposite to the x-axis direction) of the battery cell stack 120.

The upper cover 220 may be formed to have a plate-shaped structure that covers a lower surface thereof that is surrounded by the U-shaped frame 210 and an upper surface thereof (z-axis direction) other than the opposite side surfaces. The upper cover 220 and the U-shaped frame 210 may form a structure that covers the battery cell stack 120 up, down, left, and right by being coupled by welding or the like in a state in which corresponding corner portions thereof are in contact with each other. The battery cell stack 120 may be physically protected through the upper cover 220 and the U-shaped frame 210. To this end, the upper cover 220 and the U-shaped frame 210 may include a metal material having predetermined strength.

Meanwhile, although not specifically illustrated, the module frame 200 according to a variation may be a mono frame in the form of a metal plate in which an upper surface, a lower surface, and opposite side surfaces are integrated. That is, the U-shaped frame 210 and the upper cover 220 are not mutually coupled, but may be manufactured by extrusion molding to have a structure in which the upper surface, the lower surface, and opposite side surfaces are integrated.

The end plate 400 may be formed to cover the battery cell stack 120 by being positioned on open opposite sides (y-axis direction and opposite direction thereto) of the module frame 200. The end plate 400 may physically protect the battery cell stack 120 and other electrical components from external impact.

Meanwhile, although not specifically illustrated, a bus bar frame on which a bus bar is mounted and an insulating cover for electrical insulation may be positioned between the battery cell stack 120 and the end plate 400.

Hereinafter, fixing of the battery module 100 through the fixing bracket 500 will be described in detail with reference to FIG. 6 to FIG. 8 and the like.

FIG. 6 illustrates a partial enlarged perspective view showing the pack frame and the fixing bracket of FIG. 4. FIG. 7 illustrates a partial cross-sectional view taken along a line A-A' of FIG. 3. FIG. 8 illustrates a partial cross-sectional view taken along a line B-B' of FIG. 3.

Referring to FIG. 6 and FIG. 7, protrusions 410 are formed on front and rear surfaces of the battery module 100 according to the present embodiment. The end plates 400 of the battery module 100 may be positioned on the front and rear surfaces of the battery module 100, and the protrusions 410 may be formed on the end plates 400. Specifically, the protrusions 410 may have a structure that protrudes in a direction that is perpendicular to a stacking direction of the battery cells 110 (a direction parallel to the y-axis). That is, the protrusion 410 formed on the front surface of the battery module 100 may protrude in the y-axis direction, and the protrusion 410 formed on the rear surface of the battery module 100 may protrude in the opposite direction to the y-axis direction.

In addition, the protrusions 410 may be respectively formed at a lower edge of the front surface of the battery module 100 and a lower edge of the rear surface of the battery module 100, and two protrusions 410 spaced apart from each other may be formed for each of the front and rear surfaces of the battery module 100.

The fixing bracket 500 may be coupled to the pack frame 1100 while surrounding the protrusions 410. Specifically, each of the protrusions 410 may be formed to protrude from the end plate 400 and to have an upper surface and three side surfaces, and the fixing bracket 500 includes a fixing unit 510 surrounding the upper surface and one side of the protrusion 410. Further, the fixing unit 510 may further wrap the other two sides of the protrusion 410. Referring to FIG. 7A, each of the front and rear end plates 400 is not directly coupled to the pack frame using bolts and is indirectly coupled to the pack frame by the respective front and rear fixing brackets 500 having an interference fit with the protrusions 410, such that a closest distance D1 between opposite ones of the front and rear fixing brackets is less than a farthest linear distance D2 between opposite ones of the protrusions.

Referring to FIG. 4, FIG. 6 and FIG. 8, a bracket hole 500H is formed in the fixing bracket 500, and a first pack frame hole 1111H is formed in the pack frame 1100. The battery pack according to the present embodiment may include a first bolt B1 passing through the first pack frame hole 1111H and the bracket hole 500H, and a first nut N1 coupled to the first bolt B1.

Specifically, the bracket hole 500H and the first pack frame hole 1111H may be positioned to correspond to each other, and the first bolt B1 may be upright by extending through the first pack frame hole 1111H and the bracket hole 500H. Thereafter, the first bolt B1 may be coupled to the first nut N1 to fix the fixing bracket 500 to the pack frame 1100. For effective fixing, it is preferable that the first pack frame hole 1111H, the bracket hole 500H, the first bolt B1, and the first nut N1 are each configured in a plurality, and in FIG. 6, each of them is illustrated to include four pieces.

Two fixing brackets 500 positioned to face each other with the battery module 100 interposed therebetween are coupled to the pack frame 1100 through the first bolt B1 and the first nut N1 while wrapping the protrusions 410 of the battery module 100, and thus the battery module 100 may be accommodated and fixed to the pack frame 1100.

Meanwhile, as illustrated in FIG. 7, the battery pack according to the present embodiment may further include an insulating member 700 positioned between the protrusions 410 and the pack frame 1100. The insulating member 700 may be a pad-shaped member exhibiting electrical insulation. Galvanic corrosion may occur between the end plate 400 and the pack frame 1100 due to contact of different materials, and by positioning the insulating member 700 therebetween, occurrence of the galvanic corrosion may be prevented.

Meanwhile, referring again to FIG. 5, the battery module 100 according to the present embodiment may include a heat sink 300 positioned under the bottom portion 210a of the module frame 200, and the bottom portion 210a of the module frame 200 may constitute an upper plate of the heat sink 300. A recessed portion 340 of the heat sink 300 and the bottom portion 210a of the module frame 200 may form a refrigerant passage.

Specifically, the heat sink 300 may include a lower plate 310 that forms a skeleton of the heat sink 300 and is directly connected to the bottom portion 210a of the module frame 200 by welding, etc., and the recessed portion 340 that is a passage through which a refrigerant flows.

The recessed portion 340 of the heat sink 300 corresponds to a portion in which the lower plate 310 is recessed downward. The recessed portion 340 may be a U-shaped pipe with a cross-section cut with an xz plane that is perpendicular to a direction in which a refrigerant passage extends, and the bottom portion 210a may be positioned at an open upper side of the U-shaped pipe. As the heat sink 300 comes into contact with the bottom portion 210a, a space between the recessed portion 340 and the bottom portion 210a serves as a region through which a refrigerant flows, that is, a flow passage of the refrigerant. Accordingly, the bottom 210a of the module frame 200 may contact the refrigerant.

There is no particular limitation on the manufacturing method of the recessed portion 340 of the heat sink 300, but it is possible to form the U-shaped depressed portion 340 with an open upper side by providing a structure that is recessedly formed with respect to the plate-shaped heat sink 300.

The heat sink 300 may include an inlet 320 through which the refrigerant is introduced and an outlet 330 through which the refrigerant is discharged. The inlet 320 and the outlet 330 may be formed in the depressed portion 340. The refrigerant supplied between the bottom portion 210a and the heat sink 300 through the inlet 320 may move along the depression 340, and may be discharged through the outlet 330.

Meanwhile, although not illustrated, a thermally conductive resin layer including a thermal resin may be positioned between the bottom 210a of the module frame 200 of FIG. 5 and the battery cell stack 120. The thermally conductive resin layer may be formed by applying the thermal resin to the bottom portion 210a and curing the applied thermal resin.

The thermally conductive resin may include a thermally conductive adhesive material, and specifically, may include at least one of a silicone material, a urethane material, or an acrylic material. The thermally conductive resin may serve to fix one or more battery cells 110 constituting the battery cell stack 120 by being liquid during application or being cured after application. In addition, heat generated in the battery cell 110 may be quickly transferred to the lower side of the battery module because of excellent thermal conductivity thereof.

The battery module 100 according to the present embodiment implements a cooling integrated structure of the module frame 200 and the heat sink 300 to further improve cooling performance. Since the bottom portion 210a of the module frame 200 serves to correspond to the top plate of the heat sink 300, the cooling integrated structure may be implemented. The cooling efficiency may be increased by direct cooling, and a space utilization rate on the battery module 100 and the battery pack in which the battery module 100 is mounted may be further improved through a structure in which the heat sink 300 is integrated with the bottom portion 210a of the module frame 200.

Specifically, heat generated in the battery cell 110 may be transferred to the outside of the battery module 100 through a thermally conductive resin layer (not illustrated) positioned between the battery cell stack 120 and the bottom portion 210a, the bottom portion 210a of the module frame 200, and the refrigerant. A conventional unnecessary cooling structure may be removed to simplify a heat transfer passage and to reduce an air gap between each layer, thereby increasing cooling efficiency or performance. In particular, since the bottom portion 210a is constituted by the upper plate of the heat sink 300 and the bottom portion 210a directly contacts the coolant, more direct cooling is possible through the refrigerant.

In addition, by removing the unnecessary cooling structure, a height of the battery module 100 may be reduced, thereby reducing cost and increasing spatial utility. Further, since a plurality of battery modules 100 may be compactly arranged, capacity or output of the battery pack including battery modules 100 may be increased.

Meanwhile, the bottom portion 210a of the module frame 200 may be joined to a portion of the lower plate 310 in which the recessed portion 340 is not formed in the heat sink 300 through welding. According to the present embodiment, it is possible to obtain an effect of supporting a load of the battery cell stack 120 accommodated in the module frame 200 and reinforcing rigidity of the battery module 100 in addition to improving the above-mentioned cooling performance through the integrated cooling structure of the bottom portion 210a of the module frame 200 and the heat sink 300. In addition, the refrigerant may flow without leakage in the depressed portion 340 formed inside the lower plate 310 by sealing the lower plate 310 and the bottom portion 210a of the module frame 200 through welding, etc.

For effective cooling, as illustrated in FIG. 5, it may be preferable that the recessed portion 340 is formed over an entire area corresponding to the bottom portion 210a of the module frame 200. To this end, the recessed portion 340 may be bent at least once and lead from a first side to a second side. In particular, the depressed portion 340 may be preferably bent several times to form the depressed portion 340 over an entire area corresponding to the bottom portion 210a of the module frame 200. As the refrigerant moves from a start point to an end point of the refrigerant passage that is formed over the entire area corresponding to the bottom portion 210a of the module frame 200, efficient cooling of the entire area of the battery cell stack 120 may be achieved.

Meanwhile, the refrigerant is a medium for cooling, and there is no particular limitation, but may be a coolant.

Hereinafter, refrigerant supply to a heat sink through a pack refrigerant supply pipe will be described in detail with reference to FIG. 9 and FIG. 10.

FIG. 9 illustrates a partial perspective view showing an enlarged portion C of FIG. 3. FIG. 10 illustrates a partial cross-sectional view taken along a line D-D' of FIG. 9.

Referring to FIG. 4, FIG. 5, FIG. 9, and FIG. 10, the pack frame 1100 according to the present embodiment may include a pack refrigerant supply pipe 1130 for supplying a refrigerant and a refrigerant supply opening connected to the pack refrigerant supply pipe 1130. In addition, the pack frame 1100 may include a pack refrigerant discharge pipe 1140 for discharging the refrigerant and a refrigerant discharge opening 1160 connected to the pack refrigerant discharge pipe 1140.

The pack frame 1100 may include a support frame 1110 for supporting the battery module 100 and a lower frame 1120 positioned below the support frame 1110. The pack refrigerant supply pipe 1130 and the pack refrigerant discharge pipe 1140 may be positioned between the support frame 1110 and the lower frame 1120, and more specifically, the pack refrigerant supply pipe 1130 and the pack refrigerant discharge pipe 1140 is positioned directly below the support frame 1110, and may be of a configuration integrated with the support frame 1110.

The inlet 320 of the heat sink 300 described above may be positioned to correspond to the refrigerant supply opening 1150 of the pack frame 1100 to be connected to each other. In addition, the outlet 330 of the heat sink 300 may be positioned to correspond to the refrigerant discharge opening 1160 of the pack frame 1100 to be connected to each other. Accordingly, the refrigerant moving along the pack refrigerant supply pipe 1130 is introduced between the heat sink 300 and the bottom portion 210a through the refrigerant supply opening 1150 and the inlet 320. Thereafter, the refrigerant moving along the depressed portion 340 may be discharged to the pack refrigerant discharge pipe 1140 through the discharge port 330 and the refrigerant discharge opening 1160.

The battery pack according to the present embodiment may further include a gasket 600 surrounding the inlet 320 and the refrigerant supply opening 1150, and the gasket 600 may be positioned between the heat sink 300 and the pack frame 1100. The refrigerant may be prevented from leaking between the refrigerant supply opening 1150 through the gasket 600. Similarly, a gasket surrounding the outlet 330 of the heat sink 300 and the refrigerant discharge opening 1160 may be positioned.

Hereinafter, mounting and fixing of a module frame and a heat sink will be described in detail with reference to FIG. 9 and FIG. 11.

FIG. 11 illustrates a partial cross-sectional view taken along a line E-E' of FIG. 9.

Referring to FIG. 4, FIG. 5, FIG. 9, and FIG. 11, the module frame 200 according to the present embodiment may include a module frame extension 211 formed by extending a portion of the bottom portion 210a of the module frame 200. In addition, the heat sink 300 according to the present embodiment may include a heat sink extension 311 extending from a first side of the heat sink 300 to a portion where the module frame extension 211 is positioned. The module frame extension 211 and the heat sink extension 311 may have shapes corresponding to each other, and may be formed to extend through the end plate 400.

A second pack frame hole 1112H may be formed in the pack frame 1100, a first mounting hole 211H may be formed in the module frame extension 211, and a second mounting hole 311H may be formed in the heat sink extension 311. The battery pack according to the present embodiment may further include a second bolt B2 extending through the first mounting hole 211H, the second mounting hole 311H, and the second pack frame hole 1112H, and a second nut N2 coupled to the second bolt B2.

Specifically, the first mounting hole 211H, the second mounting hole 311H, and the second pack frame hole 1112H are positioned to correspond to each other, and the second bolt B2 may be inverted downward through the first mounting hole 211H, the second mounting hole 311H, and the second pack frame hole 1112H. Thereafter, the second bolt B2 may be coupled to the second nut N2 to fix the bottom portion 210a of the module frame 200 and the heat sink 300 to the pack frame 1100.

In addition, since the bottom portion 210a of the module frame 200 and the heat sink 300 are strongly in close contact with each other by a fastening force of the second bolt B2 and the second nut N2, a sealing property may be improved to reduce a possibility of refrigerant leakage therebetween.

For effective fixing and sealing, the second pack frame hole 1112H, the first mounting hole 211H, the second mounting hole 311H, the second bolt B2, and the second nut N2 are each configured in a plurality, and in FIG. 9 etc., each of them is illustrated to include three pieces.

In particular, as illustrated in FIG. 9 and FIG. 10, at least a portion of the inlet 320 for introducing the refrigerant into the heat sink 300 may be positioned in the heat sink extension 311. Since the heat sink extension 311 and the pack frame 1100 can also be strongly adhered to each other by the fastening force of the second bolt B2 and the second nut N2, it is possible to prevent leakage of the refrigerant in a process of introducing the refrigerant through the inlet 320. In addition, since the gasket 600 surrounding the inlet 320 and the refrigerant supply opening 1150 is also strongly compressed between the heat sink extension 311 and the pack frame 1100, the sealing property may be further improved.

Although not specifically illustrated, at least a portion of the outlet 330 for discharging the refrigerant to the heat sink 300 may be positioned in the heat sink extension 311. Accordingly, it is possible to prevent leakage of the refrigerant in a process of discharging the refrigerant through the outlet 330. In addition, since the gasket surrounding the outlet 330 and the coolant/refrigerant discharge opening 1160 is also strongly compressed between the heat sink extension 311 and the pack frame 1100, the sealing property may be further improved.

Hereinafter, a cover portion of a fixing bracket and a drain hole will be described in detail with reference to FIG. 9, FIG. 12, etc.

FIG. 12 illustrates a partial cross-sectional view taken along a line F-F' of FIG. 9.

Referring to FIG. 4, FIG. 6, FIG. 9, and FIG. 11, the fixing bracket 500 according to the present embodiment may include a cover portion 520 covering the module frame extension 211 and the heat sink extension 311. Specifically, the cover portion 520 may cover the module frame extension 211 and the heat sink extension 311 while covering an upper surface and three side surfaces except for one surface formed by the end plate 400. In addition, a fastening structure of the first bolt B1 and the first nut N1 may be respectively positioned at left and right sides of the cover portion 520, and thus the module frame extension 211 and the heat sink extension 311 may be sealed while being surrounded by the end plate 400, the cover portion 520, and the pack frame 1100.

As described above, a structure for preventing leakage of a first refrigerant may be formed while coupling the module frame extension 211, the heat sink extension 311, and the pack frame 1100 with the second bolt B2 and the second nut N2. Further, the module frame extension 211 and the heat sink extension 311 may be sealed through the cover portion 520 by forming the cover portion 520 in the fixing bracket 500 fixed with the first bolt B1 and the first nut N1, thereby forming a structure for preventing leakage of a second refrigerant. In other words, the fixing bracket 500 according to the present embodiment may not only serve to fix the battery module 100 to the pack frame 1100 but may also serve to block the refrigerant leaking from the inlet 320 or the outlet 330 of the heat sink 300 from penetrating into surrounding components. As such, a mounting fixing structure of the battery module 100 and a refrigerant leakage blocking structure may be implemented at the same time through the fixing bracket 500, thereby reducing a number of components and enabling structure simplification.

In addition, a drain-hole 1170 may be formed in a portion of the pack frame 1100 covered by the cover portion 520. The refrigerant leaking between the module frame extension 211 and the heat sink extension 311 is collected inside the cover portion 520, and this refrigerant may be discharged to a lower portion of the battery pack through the drain hole 1170. Accordingly, it is possible to improve safety of the battery module 100 by blocking the accumulated refrigerant from penetrating into the battery module 100.

Meanwhile, referring again to FIG. 5, a protrusion pattern 340D may be formed in the recessed portion 340 of the heat sink 300 according to the present embodiment. In the case of a large-area battery module in which the number of battery cells that are stacked, like the battery cell stack 120 according to the present embodiment, increases significantly compared to the prior art, the width of the refrigerant passage may be formed to be wider, so that a temperature deviation may be larger. The large-area battery module may include a case in which about 32 to 48 battery cells are stacked in one battery module compared to a case in which about 12 to 24 battery cells are stacked in one battery module. In this case, the protrusion pattern 340D according to the present embodiment has an effect of substantially reducing a width of a cooling passage, thereby minimizing a pressure drop and at the same time reducing a temperature deviation between widths of the refrigerant passage. Accordingly, it is possible to implement a uniform cooling effect.

In the present embodiment, terms indicating directions such as front, back, left, right, up, and down are used, but these terms are for convenience of description only, and may vary depending on a position of an object or a position of an observer.

One or more battery modules according to the present embodiment described above may be mounted together with various control and protection systems such as a battery management system (BMS) and a cooling system to constitute a battery pack.

The battery module or battery pack may be applied to various devices. Specifically, it may be applied to a transportation apparatus such as an electric bicycle, an electric vehicle, a hybrid vehicle, and the like, but is not limited thereto, and may be applied to various devices that can use rechargeable batteries.

While this invention has been described in connection with what is presently considered to be practical embodiments, it is to be understood that the invention is not limited to the disclosed embodiments, but, on the contrary, is intended to cover various modifications and equivalent arrangements included within the spirit and scope greater than or equal to appended claims.

DESCRIPTION OF SYMBOLS

100: battery module
200: module frame
300: heat sink
410: protrusion
500: fixing bracket
510: fixing unit
520: cover portion
1000: battery pack

The invention claimed is:

1. A battery pack comprising:
a plurality of battery modules each including a battery cell stack in which a plurality of battery cells are stacked, a module frame accommodating the battery cell stack therein, and front and rear end plates positioned on opposite respective sides of the module frame, each battery module having a protrusion formed on a front surface of the front end plate of the battery module and a protrusion formed on a rear surface of the rear end plate of the battery module;
a pack frame configured to accommodate the battery modules thereon; and
a respective front fixing bracket positioned on the front surface of the front end plate of each battery module, and a respective rear fixing bracket positioned on the rear surface of the rear end plate of each battery module,
wherein the corresponding, respective front fixing bracket positioned on the front surface of the front end plate of the corresponding battery module:
surrounds the respective protrusion formed on the front surface thereof; and
is directly coupled to the pack frame and directly contacts the pack frame, and the corresponding, respective rear fixing bracket positioned on the rear surface of the rear end plate of the corresponding battery module;
  surrounds the respective protrusion formed on the rear surface thereof; and
  is directly coupled to the pack frame and directly contacts the pack frame, and
  wherein each of the front and rear end plates is not directly coupled to the pack frame using bolts and is indirectly coupled to the pack frame by the respective front and rear fixing brackets having an interference fit with the protrusions, such that a closest distance between opposite ones of the front and rear fixing brackets is less than a farthest linear distance between opposite ones of the protrusions,
  wherein each battery module includes a heat sink positioned below a bottom portion of the respective module frame, and the bottom portion of each module frame simultaneously constitutes an upper plate of the respective heat sink.

2. The battery pack of claim 1, wherein the protrusions are formed at a lower edge of the front surface of each battery module and a lower edge of the rear surface of each battery module, respectively, and the fixing brackets each include a fixing unit surrounding an upper surface and a side surface of a respective one of the protrusions.

3. The battery pack of claim 1, wherein each fixing bracket has a bracket hole formed therein, the pack frame has a first pack frame hole formed therein, and the battery pack further comprises first bolts each extending through a corresponding one of the first pack frame holes and a corresponding one of the bracket holes and first nuts each coupled to a corresponding one of the first bolts.

4. The battery pack of claim 1, further comprising insulating members positioned between the protrusions of each battery module and the pack frame, each insulating member positioned between a respective one of the protrusions and the pack frame.

5. The battery pack of claim 1, wherein the pack frame includes a pack refrigerant supply pipe configured to supply a refrigerant and refrigerant supply openings connected to the pack refrigerant supply pipe, each heat sink includes an inlet through which the refrigerant is introduced, and each inlet and a corresponding one of the refrigerant supply openings are connected to each other.

6. The battery pack of claim 5, further comprising gaskets each positioned between a respective one of the heat sinks and the pack frame, each gasket surrounding a respective one of the inlets and a respective one of the refrigerant supply openings.

7. The battery pack of claim 1, wherein the pack frame includes a pack refrigerant discharge pipe configured to discharge a refrigerant and refrigerant discharge openings connected to the pack refrigerant discharge pipe, each heat sink includes an outlet through which the refrigerant is discharged, and each outlet and a corresponding one of the refrigerant discharge openings are connected to each other.

8. The battery pack of claim 1, wherein each module frame includes a module frame extension formed by extending a portion of the bottom portion of the module frame, and each heat sink includes a heat sink extension extending from a side of the heat sink to a portion where a corresponding one of the module frame extensions is positioned.

9. The battery pack of claim 8, wherein the pack frame has a second pack frame hole formed therein, each module frame extension has a first mounting hole formed therein, each heat sink extension has a second mounting hole formed therein, and the battery pack further comprises second bolts each extending through a corresponding one of the first mounting holes, a corresponding one of the second mounting holes, and the second pack frame hole, and second nuts each coupled to a corresponding one of the second bolts.

10. The battery pack of claim 8, wherein each fixing bracket includes a cover portion covering a corresponding one of the module frame extensions and a corresponding one of the heat sink extensions.

11. The battery pack of claim 10, wherein the pack frame has a drain hole formed in a portion of the pack frame and covered by a corresponding one of the cover portions.

12. The battery pack of claim 8, wherein each heat sink includes an inlet configured to receive inflow of the refrigerant therethrough, and at least a portion of each of the inlets is positioned in a corresponding one of the heat sink extensions.

13. The battery pack of claim 1, wherein each heat sink and the bottom portion of the corresponding module frame constitute a refrigerant passage, and the bottom portion of the corresponding module frame is in contact with the refrigerant.

14. The battery pack of claim 1, wherein each heat sink includes a lower plate joined to the bottom portion of the corresponding module frame and a depressed portion extending downwardly from the bottom portion of the corresponding module frame.

15. The battery pack of claim 1, wherein the pack frame includes a support frame for supporting each of the battery modules and a lower frame positioned below the support frame, and the support frame includes a pack refrigerant supply pipe and a pack refrigerant discharge pipe positioned between the support frame and the lower frame.

16. A device comprising the battery pack according to claim 1.

* * * * *